United States Patent
Howland et al.

[11] Patent Number: 6,018,741
[45] Date of Patent: Jan. 25, 2000

[54] METHOD AND SYSTEM FOR MANAGING OBJECTS IN A DYNAMIC INHERITANCE TREE

[75] Inventors: Michael J. Howland, Vestal; Steven M. Pritko, Endicott, both of N.Y.

[73] Assignee: International Business Machines Corporation, Armonk, N.Y.

[21] Appl. No.: 08/955,101

[22] Filed: Oct. 22, 1997

[51] Int. Cl.[7] ................................. G06F 17/30
[52] U.S. Cl. .................... 707/102; 707/100; 710/200
[58] Field of Search ............... 707/2, 100, 200, 707/9, 102, 1; 709/106; 714/27; 710/200

[56] References Cited

U.S. PATENT DOCUMENTS

| | | | |
|---|---|---|---|
| 4,344,134 | 8/1982 | Barnes | 712/16 |
| 4,410,940 | 10/1983 | Carlson et al. | 709/106 |
| 4,754,410 | 6/1988 | Leech et al. | 706/45 |
| 5,063,503 | 11/1991 | Jordan, Jr. | 710/200 |
| 5,063,504 | 11/1991 | Jordan, Jr. | 710/200 |
| 5,307,486 | 4/1994 | Nakamigawa | 707/2 |
| 5,325,527 | 6/1994 | Cwikowski et al. | 709/222 |
| 5,528,752 | 6/1996 | Kise et al. | 714/29 |
| 5,781,906 | 7/1998 | Aggarwal et al. | 707/102 |
| 5,850,516 | 12/1998 | Schneier | 713/200 |
| 5,897,636 | 4/1999 | Kaeser | 707/100 |

Primary Examiner—Gopal C. Ray
Attorney, Agent, or Firm—Ratner & Prestia; Arthur J. Samodovitz

[57] ABSTRACT

A method and system for managing an index tree structure. The index tree structure has a root node and a plurality of child nodes. Each one of the root and child nodes has at least one attribute. Each child node is assigned to a respective parent node in the index tree structure. A request is received for the value of one of the attributes of one of the child nodes; the one attribute is not defined locally within the one child node. The current value of the corresponding attribute of the parent node of the one child node is provided, in response to the request.

21 Claims, 7 Drawing Sheets

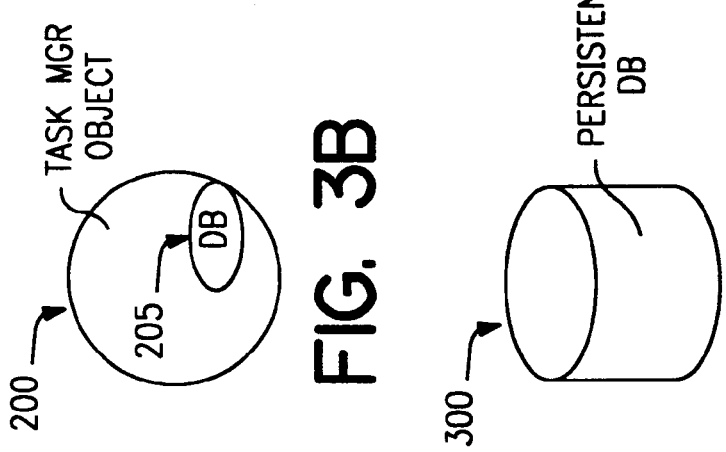
FIG. 3B
FIG. 3C
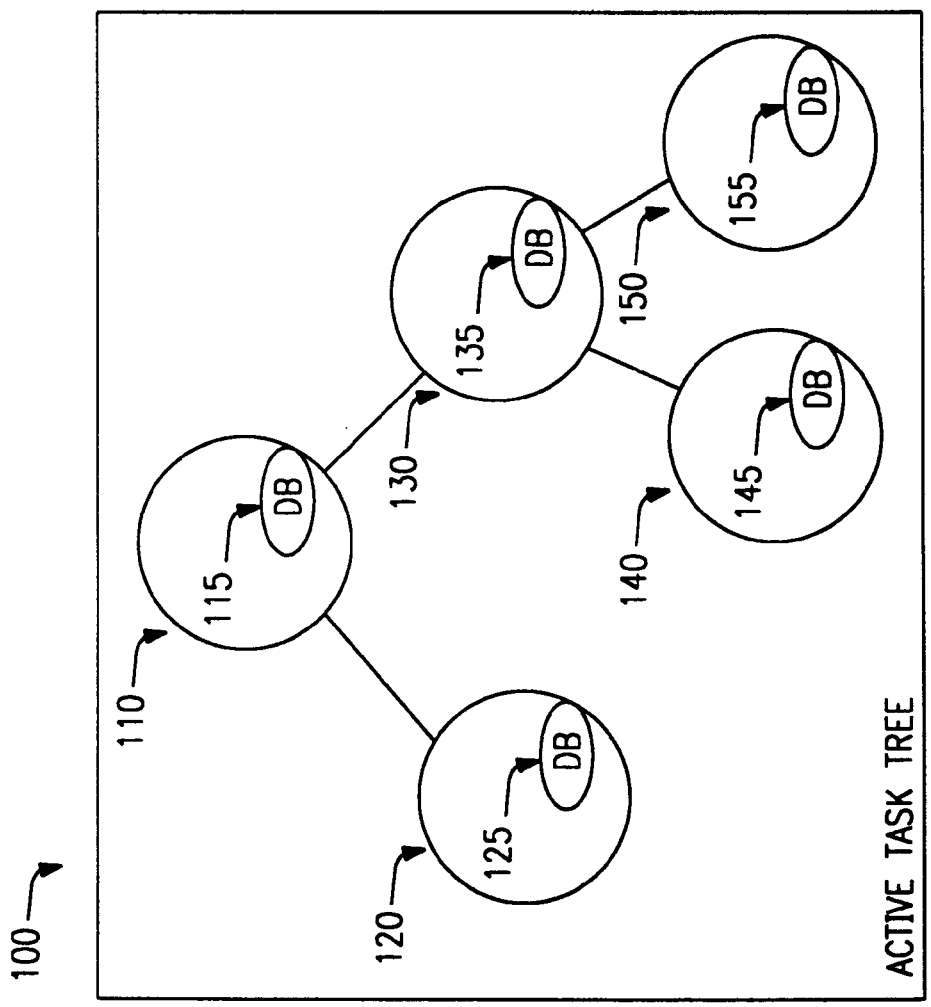
FIG. 3A

METHOD AND SYSTEM FOR MANAGING OBJECTS IN A DYNAMIC INHERITANCE TREE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to the field of information processing generally, and more specifically to methods for indexing and managing data.

BACKGROUND OF THE INVENTION

In a variety of data processing applications, a plurality of asynchronous tasks or processes are executed, concurrently, whether in a single processor or multiprocessor system. In some instances, a plurality of tasks or processes access and modify common state data.

The term, "object," as used herein, refers to a collection of state data. The state data of an object consists of one or more related attributes, each having distinct values. In the course of executing asynchronous tasks, each task may modify state data corresponding to a number of data objects.

Traditionally, when a computer program or routine was initiated, the user or calling program provided parameters and task information that are needed before the program or routine could fully execute the request. The process of defining every attribute for each object before beginning any of the tasks could be undesirable, however, as difficult or inefficient. One known technique to allow sharing of state data was the use of a system of locks. A process would apply locks against other processes, so that only the process holding the lock would read or write information from or to the locked object.

U.S. Pat. No. 5,063,503 describes apparatus for controlling concurrent process operations. The apparatus responds to a process request, for selectively locking an entity, by locking the entity and entities on which the locked entity is dependent. A tree structure is used. A list of ancestral nodes is generated. Compatibility of the requested lock with the lock status of each ancestral node is determined. An intermediate lock is applied to each appropriate ancestral node.

Prior art locking systems often result in delays, as one process waits for another process to remove a lock. A more responsive system is desired, based on a simple, flexible model.

SUMMARY OF THE INVENTION

The present invention is a method for managing an index tree structure and a system managed according to the method. The index tree structure has a root node and a plurality of child nodes. Each one of the root and child nodes has at least one attribute. Each child node is assigned to a respective parent node in the index tree structure. A request is received for the value of one of the attributes of one of the child nodes, such that the one attribute is not defined locally within the one child node. The current value of the corresponding attribute of the parent node of the one child node is provided, in response to the request.

BRIEF DESCRIPTION OF THE FIGURES

FIG. 3A is a diagram showing the storage organization of tasks in the exemplary tree structure of FIGS. 1A and 1B;

FIG. 3B shows the system task manager;

FIG. 3C is a diagram of an externally stored registry of data;

OVERVIEW

Figure 1:
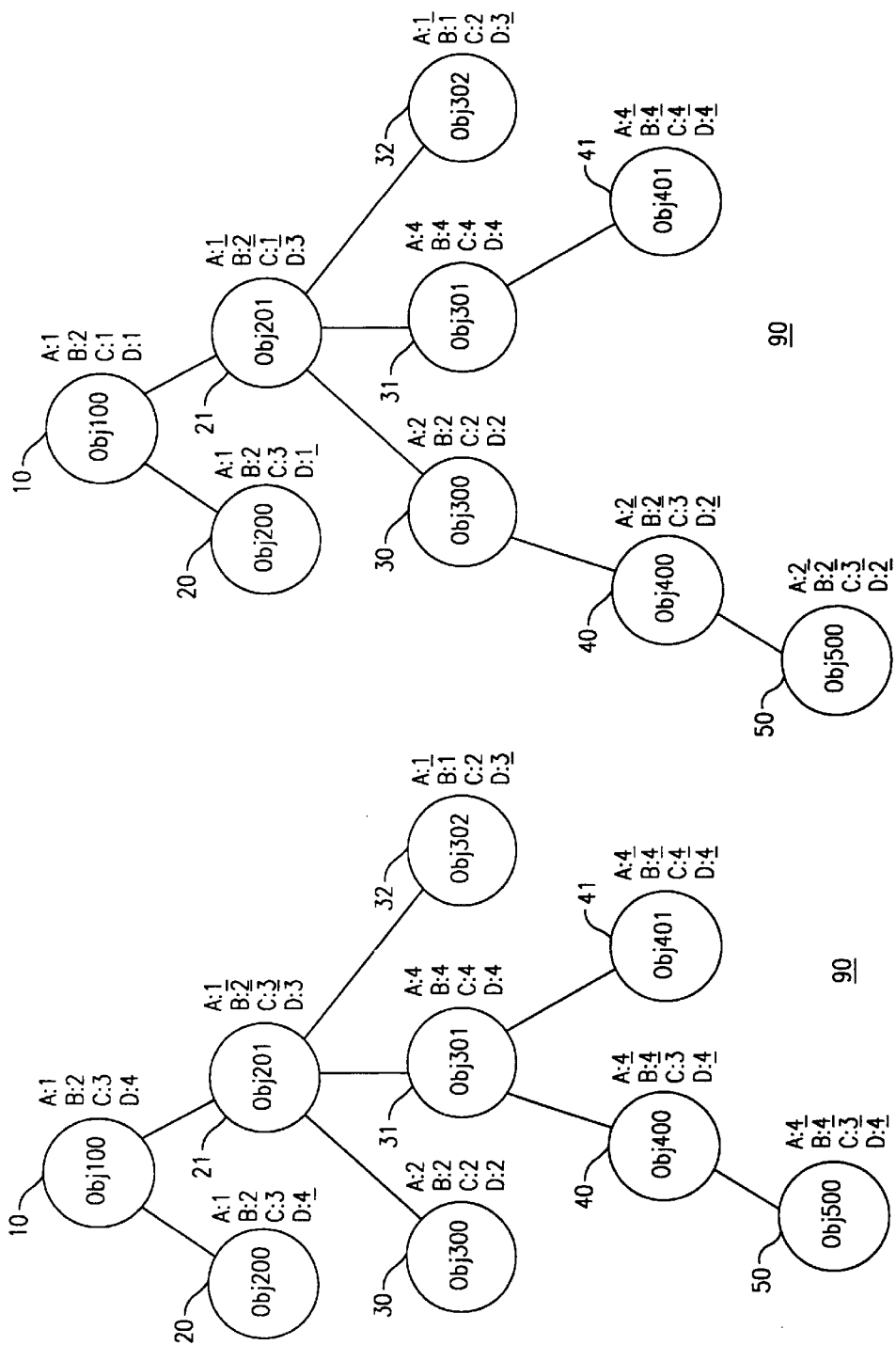
FIG. 1A is a diagram of an exemplary tree structure for managing objects in accordance with the invention.
FIG. 1B is a diagram of the tree structure of FIG. 1A, after changing attribute values in the root node and re-assigning one of the objects to a different parent node.

The present invention is a method for managing an index tree structure. The exemplary method allows the relationship between objects (which may represent tasks) to be expressed using an inheritance model which expresses a "parent/child" or "child/ancestor" relationship between pairs of distinct objects.

All of the attributes of the root (topmost node) of the tree are locally defined within the root node. Each descendant node below the root node can include one or more locally defined attributes which override one or more of the attributes of the root node. Any attribute that is not locally defined within a node is "inherited." The value of an inherited attribute is the value of the corresponding attribute in the nearest ancestor which defines the value of that attribute locally. Each object is virtually defined by its locally defined attributes and the inherited attribute values obtained from the nearest ancestor node which lies between that object and the root node.

According to a first exemplary embodiment of the present invention, when a request is received for the value of an attribute of one of the child nodes, a locally defined value of that attribute is provided, if the attribute is locally defined in that one child node. If there is no locally defined value of that attribute in the one child node, then the parent of the one child node is checked. If the requested attribute is locally defined within the parent node, then the value of the requested attribute in the parent node is "inherited" by the child node, and is provided in response to the request. If the requested attribute is not locally defined within the parent node then each successive ancestor of the one child node is interrogated until an ancestor node is found in which the value of the requested attribute is locally defined. The value of the attribute from the nearest ancestor having a locally defined value is used.

According to another aspect of the invention, if one attribute value is changed in a parent node, all child nodes in the subtree having that parent node as a root inherit the changed value, if that attribute is not locally defined in any of the child nodes. In response to a subsequent request for the one attribute in a child node, the changed value of the attribute in the parent node is provided.

According to another aspect of the invention, all of the nodes within a subtree may be relocated within the tree (i.e., the node which is the root of the subtree is re-assigned to a have new parent). When a subtree is relocated, the nodes within the subtree automatically begin to use the values of attributes that have been defined within the new parent. The parent and child objects are not tightly bound.

Thus, a child node may be moved within the index tree structure so that the child node has a new parent node different from its original parent node. In response to a subsequent request for an attribute of the moved child node, the value of the attribute of the new parent node is provided.

When a task requires the value of a specific attribute, the local object is consulted first to see whether the attribute is defined locally. If the attribute is not defined locally, then it is an inherited attribute. For determining the value of an inherited attribute, the parent of the object is checked to determined whether the attribute is defined within the parent. If necessary, more remote ancestors of the parent are checked until the first node is found in which the desired attribute is defined. The first locally defined value of the attribute in the nearest ancestor node is used as the inherited value of the attribute of the local object.

According to a second exemplary embodiment of the present invention, the values of the inherited attributes may be copied into the child nodes which inherit the attributes. In the second embodiment, the values of the inherited attributes are automatically updated under either (or both) of two different conditions: (1) when the value of the attribute changes due to a change in state in the nearest ancestor node that defines the value locally; and (2) when the relationships among two or more of the nodes change, so that the node has a new parent node.

The present invention is advantageous for a task manager suitable for manipulating tasks dynamically. The task manager can control entire subtrees of tasks within the hierarchical tree by altering the values of the parent or ancestor nodes. The ability to dynamically change the inherited attribute values, when a subtree is moved, provides flexibility in manipulating groups of tasks with ease.

Detailed Description

FIG. 1A shows an exemplary tree structure 90. The index tree structure 90 has a root node 10 and a plurality of child nodes 20 and 21; 30, 31, and 32; 40 and 41; and 50. The index is established by assigning each child node to a respective parent node in the index tree structure 90. Each one of the root and child nodes has at least one attribute. In FIG. 1A, objects are represented by circles. Each object has associated with it four attributes: A, B, C, and D. One of ordinary skill recognizes, however, that any number of attributes may be used.

Each attribute of each of the child nodes is identified as being either a locally defined attribute or an inherited attribute. In FIG. 1A, attributes of each object which are in plain font (no underscores) are locally defined in the object. For example, root node 10 (object "obj100") has all four attributes, A–D, locally defined with the values "1" to "4," respectively. Node 20 has attributes A–C locally defined with the values "1" to "3," respectively. Node 21 has the value of attribute D locally defined as the value "3."

Attributes which are underlined are inherited attributes. When the value of an inherited attribute is requested, the value of the corresponding attribute of the parent node is provided, if the value is locally defined in the parent node. In the parent node, the corresponding attribute may also be inherited, in which case the value of the corresponding attribute in the grandparent is provided (if the attribute is locally defined in the grandparent.) Ultimately, in response to a request for the value of an inherited attribute, the value of the corresponding attribute in the nearest ancestor node in which the attribute is locally defined is provided.

For example, root node 10 has no inherited attributes. Node 20 has only one inherited attribute D, which inherits the value 4. Node 21 has three inherited attributes A–C with respective values "1", "2," and "3." Because attribute A is not locally defined in nodes 21 or 32, the inherited value of the attribute A in node 32 is the same as the nearest ancestor node which defines attribute A locally, in this case root node 10.

FIG. 1B shows tree 90 after two different changes have been made. First, the attribute values of the root node 10 are changed, so that attributes C and D both have the value "1". Second, node 40 (Object "Obj400") and the subtree which has node 40 as its root are moved to a new parent node 30.

With respect to the first change, the system dynamically assigns, to each inherited attribute of each one of the child nodes (attribute D in node 20 and attribute C in node 21), the current value ("1" and "1", respectively) of the corresponding attributes C and D in the parent node 10. The updated values of attributes C and D are automatically provided in nodes 21 and 20, respectively, when requests for C and D are made after the value of the corresponding attribute of the parent node 10 changes.

On the other hand, attribute C in node 20 and attribute D in node 21 are each locally defined. The system keeps the values of each locally defined attribute of the child nodes while the inherited attributes D in node 20 and C in node 21 are being updated. All of the values of attribute C in the third level of the tree (nodes 30–32) are locally defined, so the change to the root node does not propagate any further down the tree.

With respect to the second type of change referred to above, child node 40 is reassigned from its old parent node 31 to a new parent node 30. In response to a request for an inherited attribute A, B, or D of the re-assigned child node 40, the system automatically provides the current values "2," "2," and "2," respectively, of the corresponding attributes A, B, and D in the new parent node 30. (Before the move, node 40 inherited the values "4," "4," and "4" from node 31.)

The subtree which has node 40 as its root is changed in accordance with the new attribute values inherited from new parent node 30. Thus, the inherited values of attributes A, B, and D of node 50 also change to "2," "2," and "2," respectively.

Figure 2:
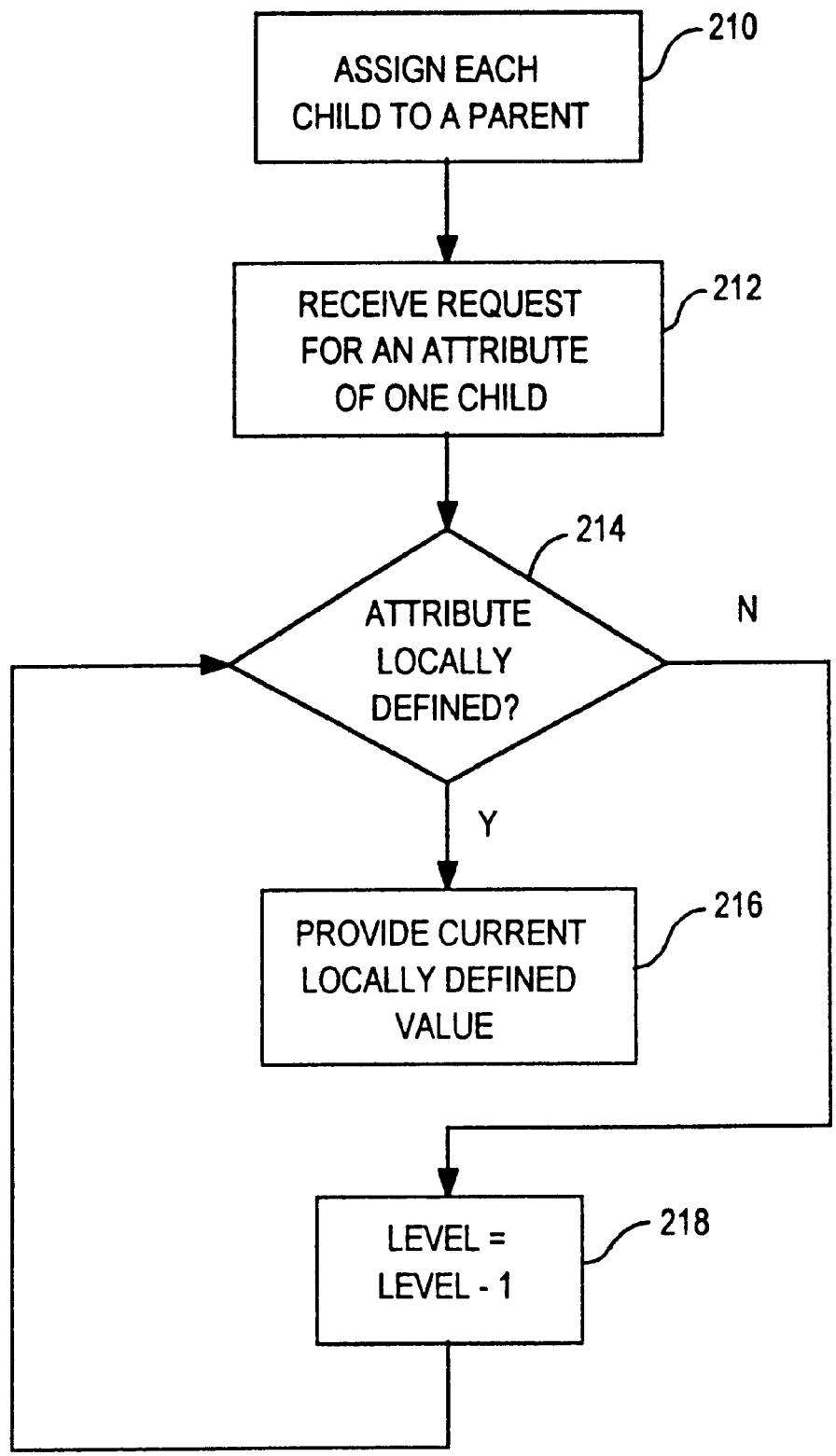
FIG. 2 is a flow chart diagram of a first exemplary method of managing objects according to the invention.

FIG. 2 is a flow chart of a first exemplary method according to the invention. The method of FIG. 2 is advantageous in a tree structure 90 in which each object has a pointer to its parent node and may have one or more data fields for locally defined attributes (if any attributes are locally defined). The method of FIG. 2 does not require each child node to include any data field for an inherited object, as explained below.

At step 210, the tree structure 90 is established and each child node is assigned to a parent node. This may be accomplished by setting a pointer the parent node in the child node.

At step 212, a request is received for an attribute of one of the child nodes. One of ordinary skill in the data processing field understands that a request occurs any time the attribute is referenced, explicitly or implicitly, within a computer software program. For the purpose of describing the invention, this request is essentially handled the same way regardless of whether the request comes in any of the following situations:

(1) after the attribute values for the objects in the tree structure are first set, before any of the attribute values are changed;

(2) after one or more of the attribute values of one or more of the objects are changed; or (3) after one or more of the child nodes is moved within the tree structure 90, by assigning the moved child node to a new parent. (This may be accomplished by modifying the pointer in the child node that points to the parent of the child node.)

At step 214, a determination is made whether the attribute is locally defined in the object (node) at which the attribute is referenced.

At step 218, if the attribute is not locally defined in the child node, then the pointer that points to the parent node is followed to the next higher level in the tree structure 90. Step 214 is again executed. Thus, the system continues up the hierarchy towards the root node of the tree structure 90, until the first node is found in which the value of the requested attribute is locally defined.

At step 216, if the attribute is locally defined, the locally defined attribute value is provided to satisfy the request.

In the method of FIG. 2, the values of the inherited attributes need not be stored anywhere; only the locally defined attribute values are saved in the node in which they are locally defined. An "inherited attribute" is defined by the absence of a locally defined attribute, and not by the presence of a copy of the corresponding attribute from the parent node.

This method is advantageous, because updates to whole subtrees may be achieved by modifying a value in a single object or node. It is not necessary to physically update the attributes of any child nodes when a parent node is changed. Rather, at the time a request is made, the attribute value of the parent is provided directly through a set of linked pointers. One of ordinary skill in the art recognizes that handling of requests following updates is simple. Regardless of whether an attribute of the parent changes, or the ancestry of a child node changes (by modifying its parent pointer), a request for an inherited attribute is handled essentially the same way.

An exemplary set of software routines embodying the method of FIG. 2 is provided below.

Figure 5:
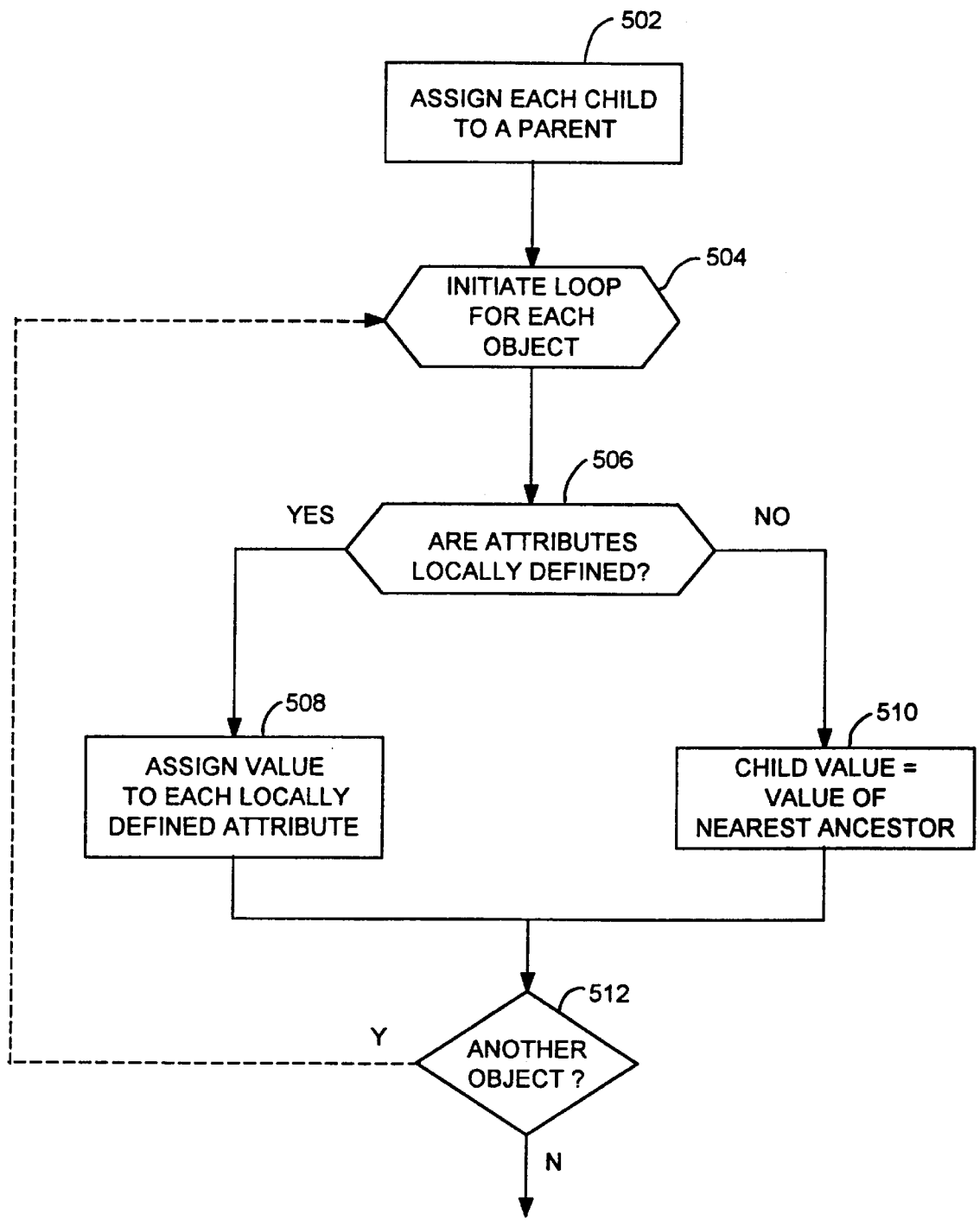
FIG. 5 is a flow chart diagram of a variation of the exemplary method for establishing the tree structure of FIG. 3A.
Figure 6:
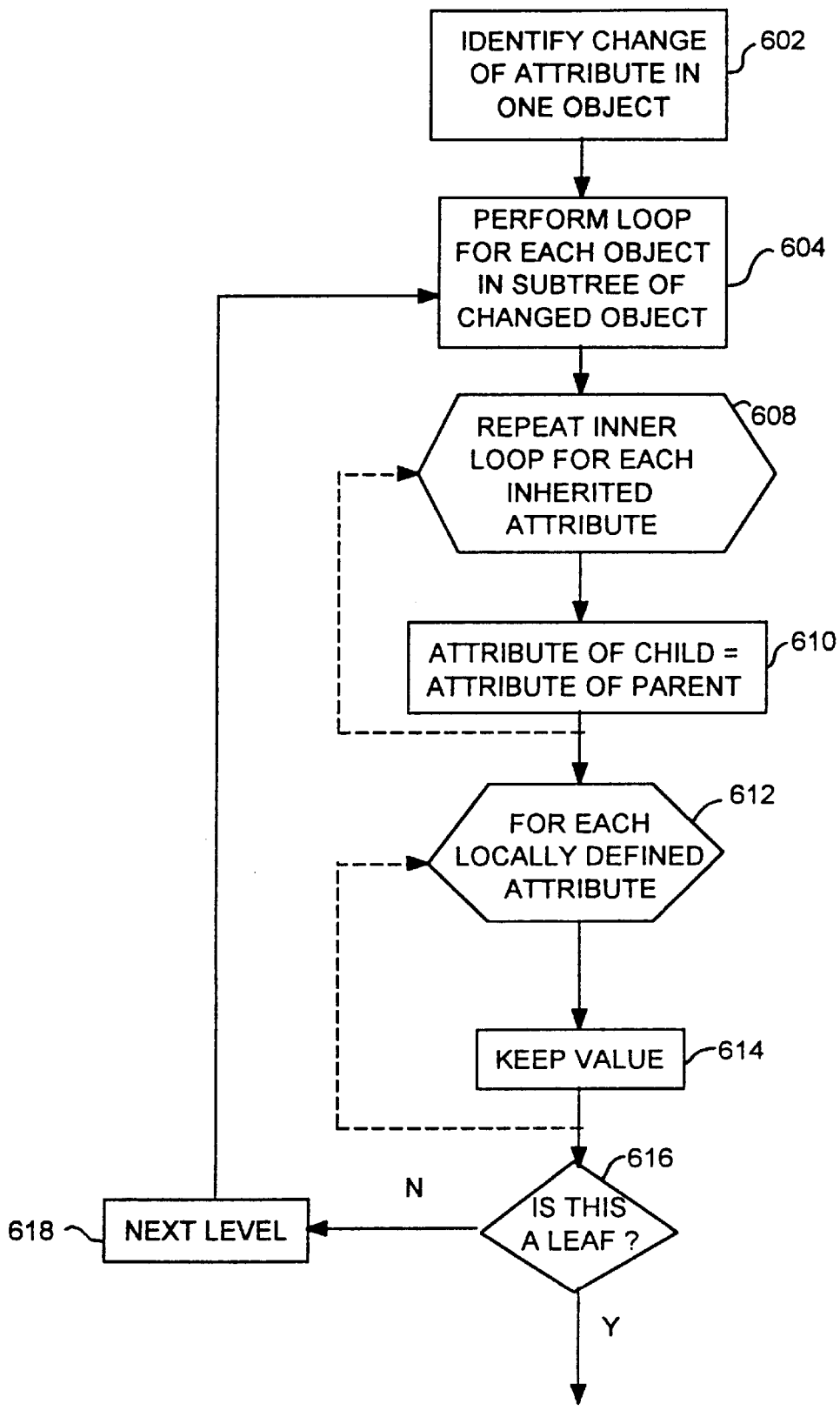
FIG. 6 is a flow chart diagram of the variation of the exemplary method for updating the tree structure of FIG. 3A when one of the objects changes.
Figure 7:
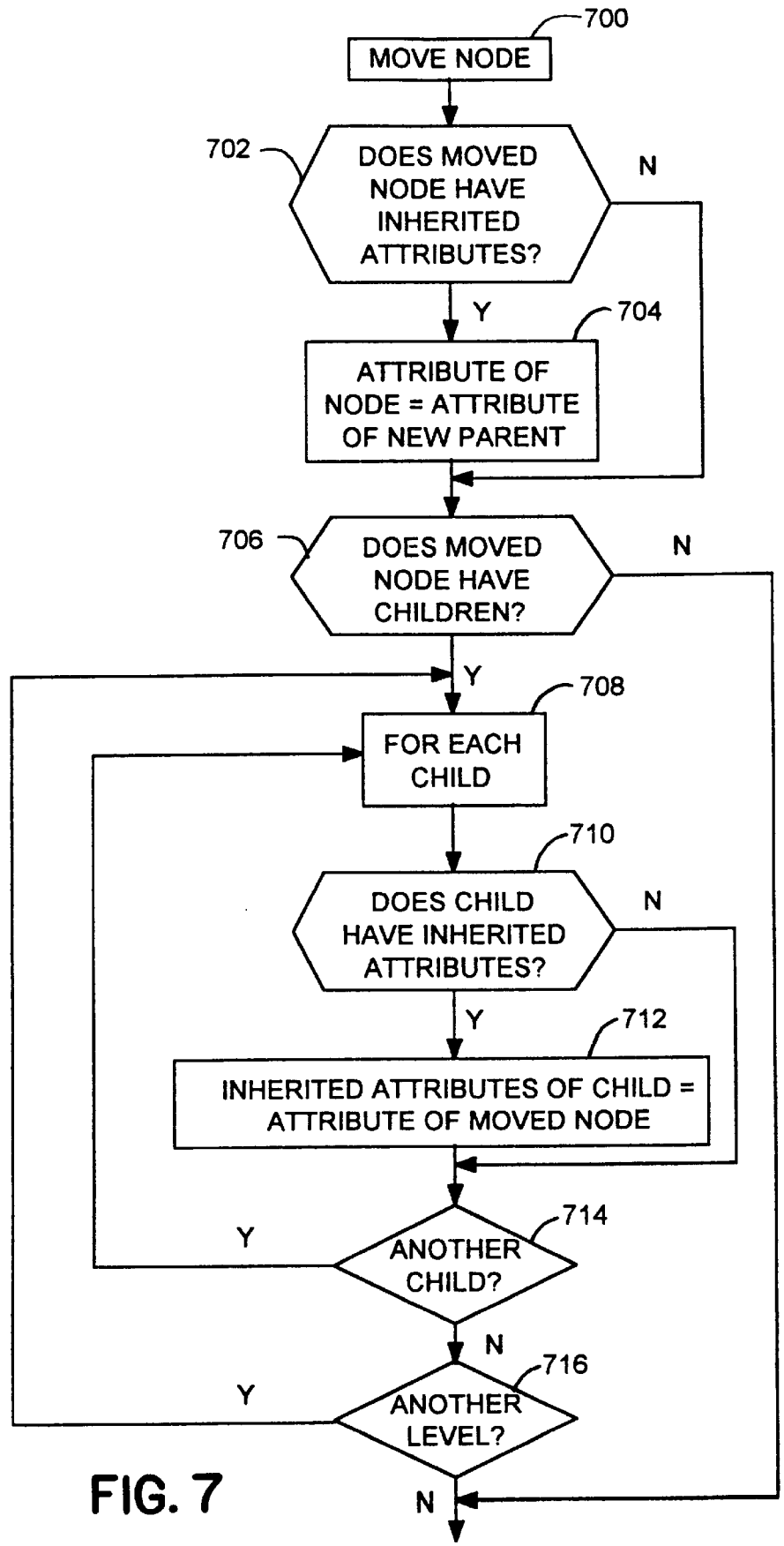
FIG. 7 is a flow chart diagram of the variation of the exemplary method for updating the tree structure of FIG. 3A when one of the nodes is re-assigned to a different parent node.

FIGS. 5, 6, and 7 are flow chart diagrams showing a variation of the exemplary method outlined above. For the variation of FIGS. 5, 6 and 7, the data structure of each child object may be slightly different from the data structure of each object in the method of FIG. 2. In the method of FIGS. 5, 6 and 7, the inherited attributes may be expressly defined within each child node. This method is slightly more complex than the method of FIG. 2, because inherited attributes are copied down through the tree structure each time one of the parent nodes is changed.

FIG. 5 shows the steps of establishing the tree structure 90. At step 502, each child node is assigned to a respective parent. At step 504, the loop is initiated for each object. At step 506, each attribute is defined as being locally defined or not locally defined (inherited). At step 508, a value is assigned to each of the locally defined attributes. At step 510, inherited attributes are defined by reference to the value of the attribute in the parent. At step 512, the loop is repeated for each object.

FIG. 6 shows how a change in an attribute of a non-leaf node propagates through the tree 90. At step 602, a change in at least one attribute is identified. At step 604, a loop is performed for each child of the changed object. At step 608, the inner loop is repeated for each inherited attribute. At step 610, the value of each inherited attribute of the child node is set equal to the value of the corresponding attribute in the parent. At steps 612 and 614, each locally defined attribute value is kept. At step 616, if this is not a leaf, then the same steps are repeated (per step 618) at the next lower level of the tree.

FIG. 7 shows how a change in the relationship between two of the objects is handled. At step 700, at least one node is moved (i.e., re-assigned to a new parent node), and all of the subtree beneath the at least one node also move. At step 702, any inherited attribute of the moved node is identified. The value of the inherited attribute is obtained by reference to the corresponding attribute in the new parent at step 704. At step 706, if the moved node has any children, the loop including steps 708 to 716 is executed for each level of the tree. Steps 708 to 714 are executed for each child in each level. At step 710, if the child has inherited attributes, then at step 712, the values of the inherited attributes of the child are set to the values of the corresponding attributes in the parent.

FIGS. 3A, 3B, and 3C show the primary components of an exemplary embodiment of the invention for managing a plurality of data objects representing tasks. Each object represents a task executed by a processor.

FIG. 3B specifically shows the task manager 200, which is the primary interface and dispatcher for all registered tasks within the system. In the exemplary embodiment, the tasks are asynchronous from one another. Also contained in task manager 200 is a respective database object 205. The database object 205 allows direct access to key/value pairings at the level of the task manager 200.

FIG. 3C shows a database 300 which is an externally stored registry of data organized in a hierarchical manner. Data stored within database 300 are organized in a fashion in which each key at a given level may have an associated value (i.e., attribute) or may represent a key to a "deeper" level within the database structure.

FIG. 3A shows the active task tree 100, which represents the storage organization of active tasks. Each of the objects 110, 120, 130, 140, and 150 within active task tree 100 is a discrete data object representing a task. Each object 110, 120, 130, 140, and 150 contains references to its respective parent and descendant objects, except that in the root node 110, the parent reference is null, and in leaf nodes (objects at the lowest level of the tree), the descendant reference is null. Also contained in each task object 110, 120, 130, 140, and 150 is a respective database object (115, 125, 135, 145, and 155). The database object allows direct access to key/ value pairings at the appropriate level for each owner task. Each task is addressed by a unique hierarchical key.

Each task is further differentiated by its position within the task tree 100. Terminal tasks (i.e., tasks that have no descendant tasks, such as object tasks 120, 140, and 150) are also referred to herein as "Single tasks." A Single task also contains a reference to a function to be run when the task is dispatched. Non-terminal object tasks (110 and 130) are also referred to herein as "Group" tasks. Group tasks do not contain references to a function to be run when the task is dispatched.

Figure 4:
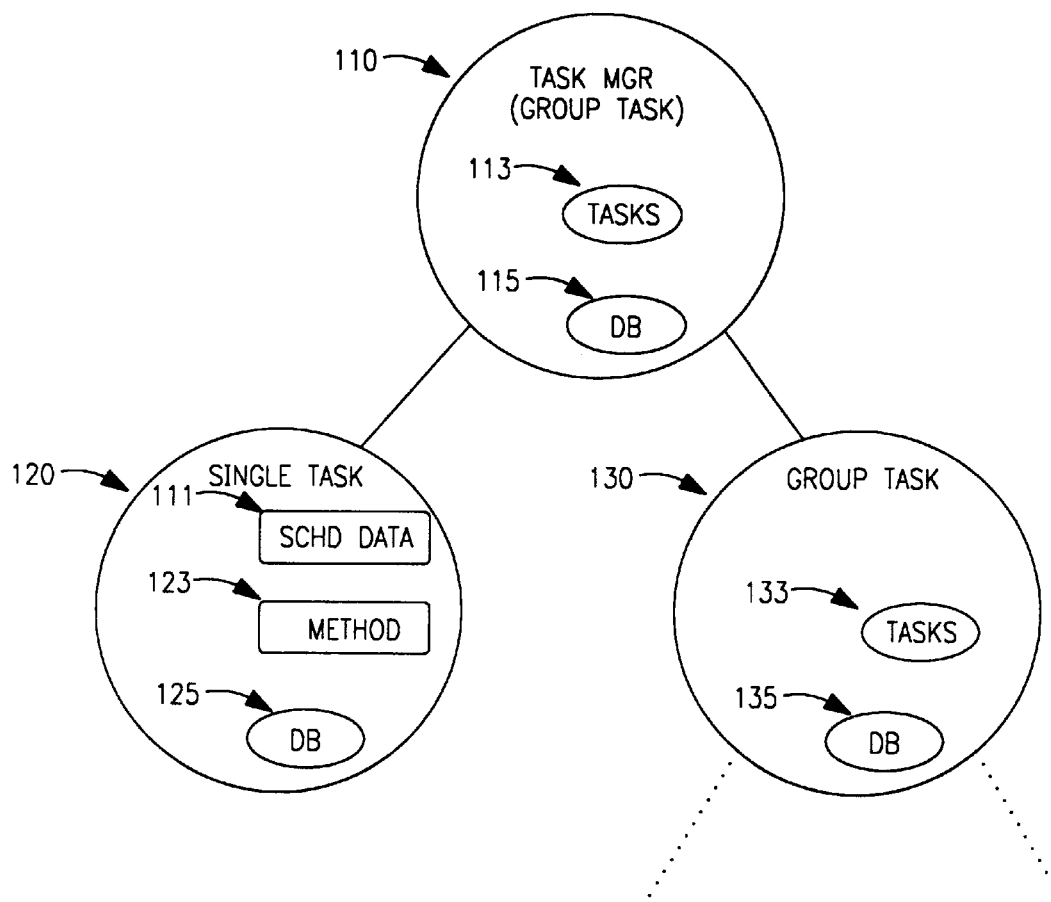
FIG. 4 is a detailed diagram showing group tasks and single tasks within the task hierarchy of FIG. 3A.

FIG. 4 shows the distinction between Group tasks and Single tasks. Group tasks may have either Group tasks or Single tasks as descendant tasks. Single tasks have no descendant tasks. More importantly, Group and Single tasks represent different types of objects. A Single task is an abstract object containing state or schedule data 111 which determine when the task should be run (see, for example, datum 123). Single tasks are sub-classed. At least one of the attributes of each object represents state data for the task represented by the object. A Group task is a concrete instantiation having an object that lists all descendant tasks in the next level immediately below the Group task (see, for example, tasks 113 and 133).

A software source code listing for an exemplary embodiment of the present invention is provided below, with explanatory comments. The comments are provided in paragraphs of text which precede each routine, and in standard embedded comment format within each routine. The embedded comments are identified by the string "//" at the beginning of each embedded comment line. Although the exemplary software is written in the C programming language, one of ordinary skill could readily construct code to perform similar functions using other programming languages.

The exemplary software embodiment provided below was developed for use in the "WBI" program, which is owned by the assignee of the present application. One of ordinary skill could readily identify other applications for managing multiple tasks in which the invention may be used.

Although the invention has been described with reference to exemplary embodiments, it is not limited thereto. Rather, the appended claims should be construed to include other variants and embodiments of the invention which may be made by those skilled in the art without departing from the true spirit and scope of the present invention. For example, although the plurality of objects are tasks in the exemplary embodiment of the invention, one of ordinary skill in the art readily recognizes that the invention may be used to manage other types of data objects besides tasks.

```
// An exemplary initialization routine is detailed in the
// following code segment. This function is executed by
// each Group task object. The initialization routine is
// responsible for running through the Database at its known
// level (referred to in the code as the level of "pDB") and
// creating and registering tasks, which may be new Single
// or Group tasks. The TaskManager 200 (FIG. 3B) also
// Single executes the initialization routine below; the
// task manager is a special Group task. TaskManager 200 is
// passed an open database object 205 by the controlling
// system when the task manager is being initialized. Each
// invocation of a Group task constructor invokes the
// initialization routine below with a successively deeper
// level of the database object. Each Single task is
// provided with the information needed to execute a
// function when the task is dispatched.

void initialize() {
    DBKeyIterator  keyIter(*pDB);    // Iterate at our level of
                                     // the database.
    char*          key;              // The key . . . obtained from
                                     // iterator
    AsyncTask*     newAST = 0;       // Superclass of Single and
                                     // Group tasks.
    DB*            newDB = 0;
    keyIter.resetIterator();
    // For each key at our level of the database we iterate and
    // create tasks.
    for (key=keyIter.nextElement(); key != NULL;
    thisKey=key.nextElement() ) {
        // Is the task at this level a group (or non terminal)
        // task?
        if ( pDB->getLong(key, "TaskIsGroup") ) {
            // Form a new DB object, advancing the key
            newDB=new DB((String)pDB->getBaseKey() + (String)"\\" +
            key);
            // Create a new group task and give it the new DB object
            newAST = new GroupTask(NULL, newDB );
        } else {
            // Create and add a single task.
            // In this implementation, the keys
            // TaskDLLname and TaskDLLentry describe the function to
            // be run when the task is dispatched.
            String dllName = String( pDB->getString(key,
            "TaskDLLname") );
            String dllEntry = String( pDB->getString(key,
            "TaskDLLentry") );
            // Form a new DB object, advancing the key. This DB
            // object will allow the single task to refer to
            // key/value pairs at it's specific level
            // within the DB structure.
            newDB = new DB( (String)pDB->getBaseKey() + (String)"\\" +
            key );
            // Create a new Single task and give it the new DB
            // object along with Information that details the
            // function to run when dispatched. In this
            // implementation, the TaskFactory class is a simple
            // helper class that implements a static method (create)
            // for the creating of specific Single tasks.
            newAST = TaskFactory::create( dllName, dllEntry, NULL,
            newDB );
        }
        // If we create a task, we record it in our state data
        // (i.e. the state data of the current task) so we can
        // dispatch them later. Lists of tasks are maintained
        // within each group node and the task manager itself.
        // Single tasks do not contain this type of state data,
        // instead they contain state data used to dispatch the
        // actual unit of work.
        if ( newAST ) {
            taskList->addEntryToList( newAST );
        }
    }
}
// The task manager object implements the following code
// segment to control the dispatching of descendant tasks.
// The task manager continues to loop around until the
// system is terminated.
nextWake = SOME_INITIAL_WAIT;
taskTerminate = 0;
while ( !taskTerminate ) {
    awoke = 0;
    // Sleep until our wait time expires or we're signaled
    while (!awoke && !taskTerminate ) {
        awoke = Sleep( nextWake );
    }
    // Ok . . . we've awaken. Somebody must have touched
    // something in our task lists or we've awaken and must
    // recheck our list of things to do now
    now = time( NULL );
    nextWake = now + TASK_MAX_WAIT;
    // No longer than now + 'TASK_MAX_WAIT'
    if ( !taskTerminate ) {
        taskListIterator->resetIterator();
        pAsyncTask = taskListIterator->nextElement();
        // Tell each task they can run and reestablish our wait
        // time.
        while ( pAsyncTask ) {
            // Ask each task if it wishes to run
            pAsyncTask->run();
            // Establish how long we are to wait by asking each
            task
            nextWake = min( nextWake, max(now, pAsyncTask-
            >queryTaskNextRun()) );
            // Advance
            pAsyncTask = taskListIterator->nextElement();
        }
    }
}
// Each task (Group or Single) implements a run() method.
// The functions of the run() methods differ from each
// other. A Single task establishes whether it is allowed
// to run (i.e., whether enough time has elapsed since the
// last execution of this task). A Group task iterates its
// predetermined list of descendant tasks, and initiates
// each of them. The descendant tasks may be either Single
// or Group tasks. Each task (Group or Single) implements a
// queryTaskNextRun() method. This method is used by the
```

// TaskManager and Group tasks to determine the amount of
// time to delay between invocations. For Single tasks,
// this value represents the time that must elapse before
// this specific task can run again. This allows a task to
// control the timing of its initiation to take into
// consideration desired timing windows (for example, only
// on certain days of the week). For a Group task, the
// value represents the minimum of all values obtained from
// its descendant tasks.
// Run, Single Task variant

```
void run() {
    // Can we run now?
    // Has enough time elapsed since last execution?
    // Can we run during this time slot? etc.
    if ( canWeRunNow() ) {
        Create a thread for execution
        Start thread
    } else {
        ; // No action, I.e. Rejecting run
    }
}
// Run, Group Task variant
void run() {
    AsyncTask*   pAsyncTask = 0;
    taskListIterator->resetIterator();
    // For each task, as it if it wishes to run
    while ( pAsyncTask = taskListIterator->nextElement() ) {
        pAsyncTask->run();
    }
}
```

// Each task has a series of named attributes that may be
// defined locally, at the corresponding level of the //
database. If defined locally, these named attributes are //
immediately available for use. Any descendant task that //
queries the value of the named attribute obtains the // value
defined in the lowest level of the tree, between // the
descendant and the root, in which that named // attribute is
defined locally. As the node at each level // is queried, the
value of the named attribute is provided, // if the attribute is
defined locally at that level. If // the named attribute is not
defined locally at that level, // then the ancestor node in the
next higher level is // queried. This is repeated until the
inherited value is // obtained. Inherited values are considered
to be read-only // data. Locally defined values are read-write.
A // task may establish a locally defined attribute with the //
same name that is read/write. Subsequent queries would //
then be satisfied using the locally defined attribute // having
the same name.
// A series of methods are implemented in the super class
// of both Group and Single tasks. These methods provide //
dynamic lookup of values. In the following exemplary //
code sample, '<type>' would be replaced by the // appropriate required return type and '<default>' would be //
replaced by an appropriate default value.

```
<type> get<type>FromTree( char* name ) {
    // Does the value exist at the local level?
    if ( pSysDB->valueExists( name ) ) {
        // Just return it
        return pSysDB->get<type>( name );
    } else {
        // It's not local, do we have a parent?
        if ( parent ) {
            // Yes, get it from our parent task.
            return parent->get<type>FromTree( name );
        } else {
            // No parent, use a default.
            return <default>;      // Key was undefined
        }
    }
}
```

// Task movement with the task organization tree has the
// effect of changing the parents of a given task, as well // as
the ancestors of all descendants of the given task. // If the
attributes used by the moved task are defined in // the
ancestor tree of the task, these values change to // reflect the
new ancestor tree after the move. This may // change the
scheduling of one or more tasks. For example, // if a task
contains no local scheduling information (i.e., // the information that determines when a task runs) but // instead relies
on the scheduling information of its // current ancestor, the
moved task uses the scheduling // information from its new
ancestor tree. The movement of // the task is described in the
pseudo code below:

```
void moveTask( String source, String target ) {
    AsyncTask*  pNodeToMove = 0;
    AsyncTask*  pNodeToMoveParent = 0;
    AsyncTask*  pNewParent = 0;
    // Protect during critical section
    LockAllStateData( true );
    // Find the node to move. Returns a pointer to the
    // to the actual task that needs to be moved. This is done by
    // traversing the task tree.
    pNodeToMove = findKeyOwner( source );
    if ( pNodeToMove ) {
        // Try to find the target. Returns a pointer to the
        // intended new parent. This must be a Group node.
        pNewParent = findKeyOwner( target );
        if ( pNewParent ) {
            // Attach to new parent. Request that the new parent
            // accept this node as an new decendant node.
            pNewParent->registerNewMember ( pNodeToMove );
            // Deregister from old parent. Request that the old
            // parent remove any references to this node.
            pNodeToMove->queryParent()->deRegisterMember(
            pNodeToMove );
            // Establish new parent in moved node. Sets the parent
            // reference in the moved node to reflect it's new
            // parent.
            pNodeToMove->setParent( pNewParent );
        } else {
            ; // Bogus target, throw error
        }
    } else {
        ; // Bogus source, throw error
    }
    // Release, critical path done
    LockAllStateData( false );
}
```

// The addition of new tasks to the task tree involves //
adding the appropriate keys to the database and // requesting
that the TaskManager reload the entire task // tree (or reload
just the new task subtree). The reload // process may involve
adding several tasks to the in // index tree structure 90. This
may result if the new task // added is, in reality, a group task
with several // descendant tasks, all of which are added.

```
void addTask( String iKey ) {
    String      tempInKey =              // Tokenize inboundkey
                iKey.translate(" ","\\");
    String      fullKey = pSysDB-
                >getBaseKey();
    unsigned    tempInKeyWords =
                tempInKey.words();
    AsyncTask*  pAsyncTask = 0;
    AsyncTask*  pAsyncTaskGood = 0;
    // Protect during critical section
```

```
    LockAllStateData( true );
    // Find the last registered group and call them to do the
    // work!  (i.e. The last node in the chain will build the
    // subtree after we provide with a key relative to it's
    // position)
    for (int i = 1; i < (int)tempInKeyWords; i++) {
        // Does this node exist?
        fullKey = fullKey + "\\" + String::word(tempInKey, i);
        pAsyncTask = findKeyOwner( fullKey );
        if ( pAsyncTask ) {
            // It existed . . . continue. Remember that 'this' node
            // is the last known 'good node'
            pAsyncTaskGood = pAsyncTask;
        } else {
            // We've reached the end of existing nodes, can we
            // append to our last known good node?
            if ( pAsyncTaskGood ) {
                // Give him the key (relative to his position)
                // Ask him to continue building the sub tree.
                pAsyncTaskGood->registerNewMember(
                    String::word(tempInKey, i) );
            } else {
                ; // Never found a 'good' node, throw error
            }
        }
    }
    // critical section finished
    LockAllStateData( false );
}
```

// The removal of tasks from the task tree involves //
calling the TaskManager with the key of the task to be //
removed. The specified task and all descendant tasks are //
removed from the tree.

```
void deleteTask( String iKey ) {
    AsyncTask*   pAsyncTask = 0;
    // Lock state data during critical section
    LockAllStateData( true );
    // Find the node to be deleted
    pAsyncTask = findKeyOwner( iKey );
    if ( pAsyncTask ) {
        // Ask the parent of the node to deregister the node to be
        // deleted.
        pAsyncTask->queryParent()->deRegisterMember
            (pAsyncTask);
    } else {
        ; // Not found, throw error
    }
    // Finished with critical section
    LockAllStateData( false );
}
```

What is claimed:

1. A method for managing an index tree structure which has a root node and a plurality of child nodes, each one of the root and child nodes having at least one attribute, comprising the steps of:

(a) assigning each child node to a respective parent node in the index tree structure;

(b) receiving a request for the value of one of the attributes of one of the child nodes, wherein the one attribute is not defined locally within the one child node; and (c) providing the current value of the corresponding attribute of the parent node of the one child node, in response to the request.

2. The method according to claim 1, wherein at least one attribute of one of the child nodes is a locally defined attribute, further comprising the step of assigning a respective value to each locally defined attribute of each of the child nodes.

3. The method according to claim 1, wherein step (c) includes automatically providing an updated value of the one attribute of the one child node when the value of the one attribute is next requested after the value of the corresponding attribute of the parent node of the one child node changes.

4. The method according to claim 1, further comprising the steps of:

(d) re-assigning the one child node to a new parent node, the new parent node being different from the parent node of step (c), the one child node having an inherited attribute which is not a locally defined attribute; and (e) automatically providing the current value of the inherited attribute of the new parent node when the value of the inherited attribute of the one child node is next requested.

5. The method according to claim 4, further comprising the steps of:

assigning a respective value to each locally defined attribute of the one child node, before step (d); and keeping the values of each locally defined attribute of the one child node during step (e).

6. A method for managing a plurality of data objects, each of the plurality of data objects having at least one attribute, at least one of the plurality of objects being identified as a parent of a child object, at least two of the plurality of objects being identified as child objects, the method comprising the steps of:

(a) assigning each child object to a respective parent object;

(b) identifying each attribute of each of the child objects as being either a locally defined attribute or an inherited attribute; and (c) dynamically assigning, to each inherited attribute of each one of the child objects, the current value of the corresponding attribute in the parent object of the one child object.

7. The method for managing a plurality of data objects according to claim 6, further comprising, between steps (b) and (c), the step of assigning a respective value to each locally defined attribute of each of the child objects.

8. The method for managing a plurality of data objects according to claim 7, wherein each object represents a task executed by a processor.

9. The method for managing a plurality of data objects according to claim 8, wherein at least one of the attributes of each object represents state data for the task represented by the object.

10. The method for managing a plurality of data objects according to claim 8, wherein the tasks are asynchronous from one another.

11. The method for managing a plurality of data objects according to claim 6, wherein one of the child objects has an inherited attribute, and step (c) includes automatically modifying the value of the inherited attribute of the one child object when the value of the corresponding attribute of the parent object of the one child object changes.

12. The method for managing a plurality of data objects according to claim 6, further comprising the steps of:

(d) re-assigning one of the child objects to a new parent object, the new parent object being different from the parent object of step (a); and (e) automatically assigning to each inherited attribute of the re-assigned child object the current value of the corresponding attribute in the new parent object.

13. The method for managing a plurality of data objects according to claim 12, further comprising the steps of:

assigning a respective value to each locally defined attribute of the one child object, before step (d); and keeping the values of each locally defined attribute of the one child object during step (e).

14. A method for managing an index tree structure which has a root node and a plurality of child nodes, each one of the root and child nodes having at least one attribute, comprising the steps of:

(a) assigning each child node to a respective parent node in the index tree structure;

(b) identifying each attribute of each of the child nodes as being either a locally defined attribute or an inherited attribute; and (c) dynamically assigning, to each inherited attribute of each one of the child nodes, the current value of the corresponding attribute in the parent node of the one child node.

15. The method according to claim 14, further comprising, between steps (b) and (c), the step of assigning a respective value to each locally defined attribute of each of the child nodes.

16. The method according to claim 14, wherein one of the child nodes has an inherited attribute which is not a locally defined attribute, and step (c) includes automatically modifying the value of the inherited attribute of the one child node when the value of the corresponding attribute of the parent node of the one child node changes.

17. The method according to claim 14, wherein one of the child nodes has an inherited attribute, the method further comprising the steps of:

(d) re-assigning one of the child nodes to a new parent node, the new parent node being different from the parent node of step (a); and (e) automatically assigning to each inherited attribute of the re-assigned child node the current value of the corresponding attribute in the new parent node.

18. The method according to claim 17, further comprising the steps of:

assigning a respective value to each locally defined attribute of the one child node, before step (d); and keeping the values of each locally defined attribute of the one child node during step (e).

19. A system for managing a plurality of data objects comprising:

index tree means having a root node and a plurality of child nodes, each one of the root and child nodes having at least one attribute, each child node being assigned to a respective parent node;

means for receiving a request for the value of one of the attributes of one of the child nodes, wherein the one attribute is not defined locally within the one child node; and means for providing the current value of the corresponding attribute of the parent node of the one child node, in response to the request.

20. The system according to claim 19, wherein the current value providing means include means for automatically providing an updated value of the one attribute of the one child node when the value of the one attribute is next requested after the value of the corresponding attribute of the parent node of the one child node changes.

21. The system according to claim 19, further comprising:

means for re-assigning the one child node to a new parent node, the one child node having an inherited attribute which is not a locally defined attribute; and means for automatically providing the current value of the inherited attribute of the new parent node when the value of the inherited attribute of the one child node is next requested.

* * * * *